United States Patent
Agrawal et al.

[19]

[11] Patent Number: 6,134,215
[45] Date of Patent: *Oct. 17, 2000

[54] USING ORTHOGONAL WAVEFORMS TO ENABLE MULTIPLE TRANSMITTERS TO SHARE A SINGLE CDM CHANNEL

[75] Inventors: Avneesh Agrawal; Brian K. Butler, both of San Diego, Calif.

[73] Assignee: Qualcomm Incorpoated, San Diego, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/627,831

[22] Filed: Apr. 2, 1996

[51] Int. Cl.$^7$ .............................. H04B 7/216; H04J 13/02
[52] U.S. Cl. ........................... 370/209; 370/342; 370/479
[58] Field of Search ..................................... 370/206, 208, 370/209, 320, 328, 329, 335, 342, 441, 479; 375/200, 205–210, 344, 346, 347, 348, 349; 455/501, 509, 526, 62, 63, 103

[56] References Cited

U.S. PATENT DOCUMENTS

| | | | |
|---|---|---|---|
| 5,416,797 | 5/1995 | Gilhousen et al. | 370/209 |
| 5,465,269 | 11/1995 | Schaffner et al. | 370/335 |
| 5,602,833 | 2/1997 | Zehavi | 370/335 |
| 5,619,526 | 4/1997 | Kim et al. | 370/335 |
| 5,623,485 | 4/1997 | Bi | 370/209 |
| 5,652,764 | 7/1997 | Kanzaki et al. | 370/209 |

FOREIGN PATENT DOCUMENTS

| | | | |
|---|---|---|---|
| 0491668 | 6/1992 | European Pat. Off. | H04J 13/00 |
| 9200639 | 1/1992 | WIPO | H04L 27/30 |
| 9515626 | 6/1995 | WIPO | H04J 13/06 |
| 9605669 | 2/1996 | WIPO | H04J 11/00 |
| 9703503 | 1/1997 | WIPO | H04B 1/707 |

*Primary Examiner*—Ricky Ngo
*Attorney, Agent, or Firm*—Phillip R. Wadsworth; Gregory D. Ogrod

[57] ABSTRACT

A system and method for enabling multiple transmitters (400) to share a single code division multiplexed (CDM) or code division multiple access (CDMA) channel using orthogonal waveforms. A set of orthogonal channelizing codes $W_i(t)$ is generated, and each transmitter (400) is allocated orthogonal channelizing codes and pseudonoise polynomials in a predetermined manner. The transmitters channelize each user signal using an orthogonal channelizing code $W_i(t)$, and spread each user signal using a pseudonoise (PN) spreading code. Each transmitter employs the same PN spreading codes and time offsets. Additionally, no one orthogonal channelizing code is assigned to more than one transmitter during the time period they are sharing a CDM channel. The spread signals are summed at each transmitter (404) prior to transmission as a composite signal. The offsets are time-precorrected (406, 510) to ensure time alignment at the receivers. The frequencies of the signals are precorrected (408, 512) to ensure frequency alignment at the receivers.

30 Claims, 8 Drawing Sheets

USING ORTHOGONAL WAVEFORMS TO ENABLE MULTIPLE TRANSMITTERS TO SHARE A SINGLE CDM CHANNEL

BACKGROUND OF THE INVENTION

I. Field of the Invention

The present invention relates generally to spread spectrum communications systems, and more particularly to enabling multiple transmitters to share a single code divis on multiplexed (CDM) or code division multiple access (CDMA) channel, as a shared resource in such systems.

II. Description of the Related Art

In a code division multiplexed (CDM) system, signals intended for one or more recipients are transmitted from a single site using a single frequency band, or CDM channel, through the proper assignment of channelizing codes to create code channels. Such systems include, for example, paging systems, message or information broadcast systems, and positioning or position determination systems in which information is transferred to various targeted recipients. Some CDM systems, such as spread spectrum code division multiple access (CDMA) communication systems obtain code channels by assigning orthogonal channelizing codes, such as Walsh codes, or spreading codes with low correlation to each system user.

A variety of multiple access communication systems and techniques have been developed for transferring information among a large number of system users. However, spread spectrum modulation techniques, such as used in (CDMA) communication systems provide significant advantages over other modulation schemes, especially when providing service for a large number of communication system users. Such techniques are disclosed in the teachings of U.S. Pat. No. 4,901,307, which issued Feb. 13, 1990 under the title "Spread Spectrum Multiple Access Communication System Using Satellite Or Terrestrial Repeaters", and U.S. patent application Ser. No. 08/368,570 filed under the title "Method And Apparatus For Using Full Spectrum Transmitted Power In A Spread Spectrum Communication System For Tracking Individual Recipient Phase Time And Energy," which are both assigned to the assignee of the present invention, and incorporated herein by reference.

The above-mentioned patents disclose multiple access communication systems in which a large number of generally mobile or remote system users each employ at least one transceiver to communicate with other system users or users of other connected systems, such as a public telephone switching network. The transceivers communicate through gateways and satellites, or terrestrial base stations (also sometimes referred to as cell-sites or cells).

Base stations cover cells, while satellites have footprints on the surface of the Earth. In either system, capacity gains can be achieved by sectoring, or subdividing, the geographical regions being covered. Cells can be divided into "sectors" by using directional antennas at the base station. Similarly, a satellite's footprint can be geographically divided into "beams", through the use of beam forming antenna systems. These techniques for subdividing a coverage region can be thought of as creating isolation using relative antenna directionality or space division multiplexing. In addition, provided there is available bandwidth, each of these subdivisions, either sectors or beams, can be assigned multiple CDMA channels through the use of frequency division multiplexing (FDM). In satellite systems each CDMA channel is referred to as a "sub-beam", because there may be several of these per "beam".

In a typical spread-spectrum communication system, one or more preselected pseudonoise (PN) code sequences are used to modulate or "spread" user information signals over a predetermined spectral band prior to modulation onto a carrier signal for transmission as communication signals. PN spreading, a method of spread-spectrum transmission that is well known in the art, produces a sigial for transmission that has a bandwidth much greater than that of the data signal. In the base station- or gateway-to-user communication link, PN spreading codes or binary sequences are used to discriminate between signals transmitted by different base stations or over different beams, as well as between multipath signals. These codes are typically shared by all communication signals within a given cell or sub-beam.

In a typical CDMA spread-spectrum communication system, channelizing codes are used to discriminate between different users within a cell or between user signals transmitted within a satellite sub-beam on a forward link (i.e., the signal path from the base station or gateway to the user transceiver). That is, each user transceiver has its own orthogonal channel provided on the forward link by using a unique 'channelizing' orthogonal code. Walsh functions are generally used to implement the channelizing codes, with a typical code length for the forward link being on the order of 64 code chips for terrestrial systems and 128 code chips for satellite systems.

In general, a CDMA satellite system makes an assignment of system resources to the many gateways. The simplest assignment scheme is to divide up resources at the resolution of whole CDMA channels, or sub-beams. The system assigns whole sub-beams of individual satellites to individual gateways for specified periods of time. However, when there are many more gateways than available sub-beams, the assignment of whole CDMA channels potentially becomes inefficient in using system resources. In such situations, it could prove useful to share a sub-beam between gateways. This increases the resolution of system resources available for assignment.

Therefore, it is desirable for multiple gateways to share one CDMA channel or sub-beam as a shared resource. However, according to conventional wisdom, the sharing of a CDMA or CDM channel by multiple transmitters results in signal interference at the receivers. It will be apparent to one skilled in the art that this discussion also applies to terrestrial (e.g., cellular) communications systems employing base stations rather than gateways, and several types of message or information broadcast systems.

What is needed, therefore, is a method for enabling multiple transmitters (e.g., gateways, base stations to share a single CDM channel without the creation of interference.

SUMMARY OF THE INVENTION

The present invention is a system and method for enabling multiple transmitters to share a single CDM, or CDMA, channel using orthogonal waveforms. Applicants have found that, contrary to conventional wisdom, multiple transmitters may share a single CDM channel using orthogonal waveforms when certain aspects of transmitter operation are constrained according to the present invention. Furthermore, according to conventional wisdom, it is impractical to control carrier wave phase from multiple transmitters so as to be aligned at one, or each of several, mobile receivers. Applicants have found that when the methodology of the present invention is employed, certain operating Parameters such as relative carrier phase need not be controlled or adjuster over the period of interest. By requiring certain transmitter operating characteristics to be controlled, the present invention renders the sharing of a CDM channel by multiple transmitters quite practical and useful.

According to a preferred embodiment of the invention, each transmitter sharing a single CDMA channel is allocated a portion of a predefined set of Walsh codes, which are used to channelize the user information signals. Further, all of the sharing transmitters spread the channelized user signals using the same pseudonoise (PN) spreading code and offset. The transmitters may then share a single frequency band (CDM or CDMA channel) without mutual interference when the following transmitter operating constraints are observed: each transmitter employs the same PN spreading code or pair of quadrature PN code sequences and time offsets; time offsets are precorrected to ensure time alignment at the receiver; the frequencies of the signals are precorrected to ensure frequency alignment at the receiver; and no one (orthogonal channelizing code is assigned to more than one transmitter, at a time.

One purpose of the preferred embodiment of the present invention is to permit multiple transmitters to share single CDMA channel without creation of mutual interference.

The present invention likewise permits multiple transmitters to share a single CDM channel without creation of mutual interference.

An advantage of the present invention is that it improves the signal-to-noise ratio of the specific communication signals and the system.

Another advantage of the present invention is that it permits improved time and phase tracking for signals.

A further advantage of the present invention is that it permits improved frequency tracking.

Yet another advantage of the present invention is that it permits better signal pull-in during acquisition.

Another purpose of the present invention is to permit the use of multiple pilot signals for frequency tracking. Because each transmitter sharing a CDMA channel according to the present invention provides a pilot signal, multiple pilot signals are available at a receiver for use in frequency tracking. One advantage of the use of multiple pilot signals for frequency estimation is that this technique permits faster frequency pull-in. Another advantage of this technique is that it permits frequency tracking at lower signal-to-noise ratios. Yet another Advantage of this technique is that it permits better overall demodulation Performance in a fading channel; when one pilot signal is fading, its power can be supplemented by that of pilot signals from other transmitters to maintain carrier lock. Still another advantage of this technique is that it permits the use of a lower-power pilot signal.

Further features and advantages of the present invention, as well as the structure and operation of various embodiments of the present invention, will become more apparent from the detailed description set forth below with reference to the accompanying drawings.

BRIEF DESCRIPTION OF THE DRAWINGS

The invention is best understood by reference to the drawings wherein references with like reference numbers indicate identical or functionally similar elements. In addition, the left-most digit of the reference number refers to the figure in which the reference number first appears in the accompanying drawings.

DETAILED DESCRIPTION OF THE PREFERRED EMBODIMENTS

I. Introduction

Figure 1:
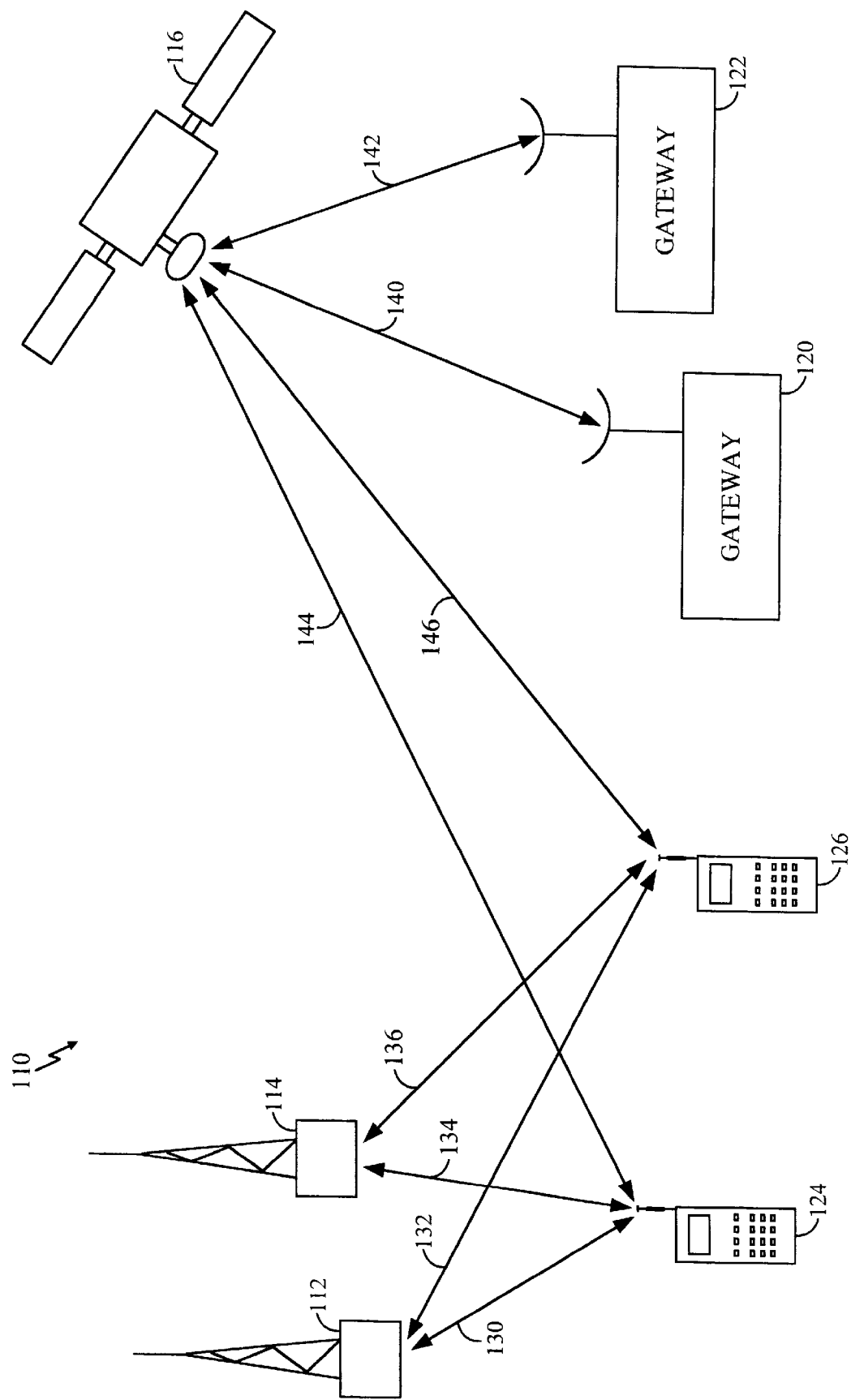
FIG. 1 illustrates a typical multiple access communication system.

The present invention is a system and method for enabling multiple transmitters to share a single CDM channel, or a single common broadband signal resource. A preferred embodiment is discussed. First, however, a number of aspects of the invention necessary to its understanding are discussed.

While specific steps, configurations and arrangements are discussed, it should be understood that this is done for illustrative purposes only. A person skilled in the relevant art will recognize that other steps, configurations and arrangements can be used without departing from the spirit and scope of the invention.

As described above, a typical CDMA wireless communication system employs at least one frequency band for the transmission of signals using spread-spectrum CDMA techniques; each frequency band is known as a CDMA Channel. Different CDMA Channels are used to transfer different communication signals to different sets of users. The CDMA Channels can also be reallocated to other systems for reuse under various Federal Communications Commission (FCC) plans, or separated by intermediate bands used by other services. The geogralphical coverage area for different CDMA channels can overlap partially or completely depending on the communication system design selected. Users can switch between CDMA channels for purposes of capacity, satellite coverage or position, signal strength, interference, and the like.

In a CDMA communication system, multiple users transmitting from a single site may share a single frequency band (CDMA channel) through proper assignment to each of orthogonal channelizing codes, such as Walsh codes. In a typical CDMA system, the available spectrum is divided into a number of frequency bands, each of which represents a CDMA channel. Then, each CDMA channel is parsed into a number of code channels by applying channelizing codes to the signals to be transmitted. Each code channel is a separate communications channel, capable of carrying voice, data, etc. In a preferred embodiment of the invention, each code channel within a CDMA channel has been created by modulating a data signal with a different Walsh code selected from one set of Walsh codes. An exemplary set of known codes are specified in the IS-95 system specification entitled "Mobile Station-Base Station Compatibility Standard For Dual-Mode Wideband Spread Spectrum Cellular System ," which is incorporated herein by reference. The resulting communication signals are mutually orthogonal.

II. The Generation of Walsh Codes

One type of orthogonal channelizing code is the Walsh code, which is employed in a preferred embodiment of the present invention. A discussion of the generation and use of Walsh codes is found in U.S. Pat. No. 5,103,459 entitled "System And Method For Generating Signal Waveforms In A CDMA Cellular Telephone System," U.S. Pat. No. 5,103,459 is assigned to the assignee of the present invention, and the disclosure of which is incorporated herein by reference. A short description is provided below for the reader's convenience.

It is well known in the art that a set of n orthogonal binary sequences, each of length n, for n being a power of 2, can be constructed. In fact, orthogonal binary sequence sets are also known for most lengths which are multiples of four and less than two hundred. One class of orthogonal binary sequences that are useful for the orthogonal channelizing codes, and also relatively easy to generate, is called Walsh functions. Walsh functions are derived from Walsh function matrices also known as Hadamard matrices. A Hadamard matrix of order n can be defined recursively as:

$$H_n = \begin{bmatrix} H_{n/2} & H_{n/2} \\ H_{n/2} & \overline{H}_{n/2} \end{bmatrix} \quad (1)$$

where $\overline{H}$ denotes the additive inverse of H, and over the real field $H_1=1$ (i.e. $\overline{H}_1=-1$).

Therefore, the first two Hadamard matrices of orders 2 and 4 can be represented as:

$$H_2 = \begin{bmatrix} 1 & 1 \\ 1 & -1 \end{bmatrix} \text{ and} \quad (2)$$

$$H_4 = \begin{bmatrix} H_2 & H_2 \\ H_2 & \overline{H}_2 \end{bmatrix} = \begin{bmatrix} 1 & 1 & 1 & 1 \\ 1 & -1 & 1 & -1 \\ 1 & 1 & -1 & -1 \\ 1 & -1 & -1 & 1 \end{bmatrix} \quad (3)$$

A Walsh function, $W_n$, then, is simply one of the rows of a Walsh function matrix (Hadamard matrix), and a Walsh function matrix of order 'n' is a square matrix containing n functions or sequences, each being n chips (bits) in length.

A Walsh function of order n (a well as all other orthogonal functions) has the property that over the interval of n code symbols, the cross-correlation between all the different sequences within the set is zero, provided that the sequences are time aligned with each other. This can be seen by noting that every sequence differs from every other sequence in exactly half of its bits. It should also be noted that there is always one sequence containing all ones (real) and that all the other sequences contain half ones and half minus ones.

The above-described properties of Walsh codes make them useful in CDMA communications systems. As will be described below, when two user signals are modulated using two different Walsh sequences from the same set, respectively, the resulting signals do not mutually interfere.

III. A Wireless Information System

As discussed above, the present invention could find use in a variety of wireless information and communication systems. Such systems include information broadcast systems such as typically used for paging or position determination. Other systems include, wireless communication systems, such as satellite and terrestrial cellular telephone systems. A preferred application is in CDMA spread spectrum communication systems for mobile or portable telephone service.

An exemplary wireless communication system in which the present invention is used, is illustrated in FIG. 1. The portion of a communication system 110 illustrated in FIG. 1 uses two base stations 112 and 114, one satellite 116, and two associated gateways or hubs 120 and 122. These elements of the communication system are shown establishing communications with two subscriber unit 124 and 126. Typically the base stations and satellites/gateways are components of separate communication systems, terrestrial and satellite based, but this is not necessary.

Subscriber units 124 and 126 each have or comprise a wireless communication device such as, but not limited to, a cellular telephone, a data transceiver, or a paging or position determination receiver, and can be hand-held or vehicle mounted as desired Here, the subscriber units are illustrated as handheld telephones. However, it is also understood that the teachings of the invention are applicable to fixed units where remote wireless service is desired, including 'inside' as well as 'open air' locations.

Generally, multiple beams from satellite 116 at different frequencies, also referred to as CDMA channels or 'sub-beams', can be directed to overlap the same region. It is also readily understood by those skilled in the art that beam coverage or service areas for multiple satellites, or antenna patterns for multiple base stations, might be designed to overlap completely or partially in a given region depending on the communication system design and the type of service being offered, and whether space diversity is being achieved.

A variety of multi-satellite communication systems have been proposed, such as using orbital planes in Low Earth Orbit (LEO), for servicing a large number of subscriber units. Those skilled in the art will readily understand how the teachings of the present invention are applicable to a variety of satellite system and gateway configurations, including other orbital distances and constellations. At the same time the invention is equally applicable to terrestrial based systems of various base station configurations.

Some possible signal paths are illustrated in FIG. 1 for communications occurring between subscriber units 124 and 126 and base stations 112 and 114, or through satellite 11 with gateways 120 and 122. The base station-subscriber unit communication links are illustrated by lines 130, 132, 134, and 136. The gateway-satellite communication links, between gateways 120 and 122, and satellite 116, are illustrated by lines 140 and 142, respectively. The satellite-subscriber unit communication links between satellite 116 and subscriber units 124 and 126, are illustrated by lines 144 and 146, respectively.

As stated above, gateways 120 and 122, and base stations 112 and 114, may be used as part of one or two-way communication systems or simply to transfer messages or data to subscriber units 124 and 126. In either case, gateways 120 and 122, or base stations 112 and 114, might want to share the same CDM or CDMA channels. This is especially true where base stations 112 and 114 are located close to each other or where gateways 120 and 122 currently have uneven demands on resources, or have messages for common groups of users.

IV. Spreading and Covering

Before information signals are transferred to system subscribers, they are first digitized, as necessary, and encoded and interleaved as desired, to create a basic digital communication signal. These operations use techniques well known in the art. Signals addressed to specific users are also modulated by a distinct orthogonal function or code spreading sequence assigned to that user's forward link. That is, a unique covering orthogonal code, typically a Walsh code, is used to distinguish between different users or subscriber signals within a cell or beam. This coding on the forward link of a given carrier frequency produces subscriber signals also referred to as channels. Such orthogonal functions are sometimes referred to as channelizing codes.

Figure 2A:
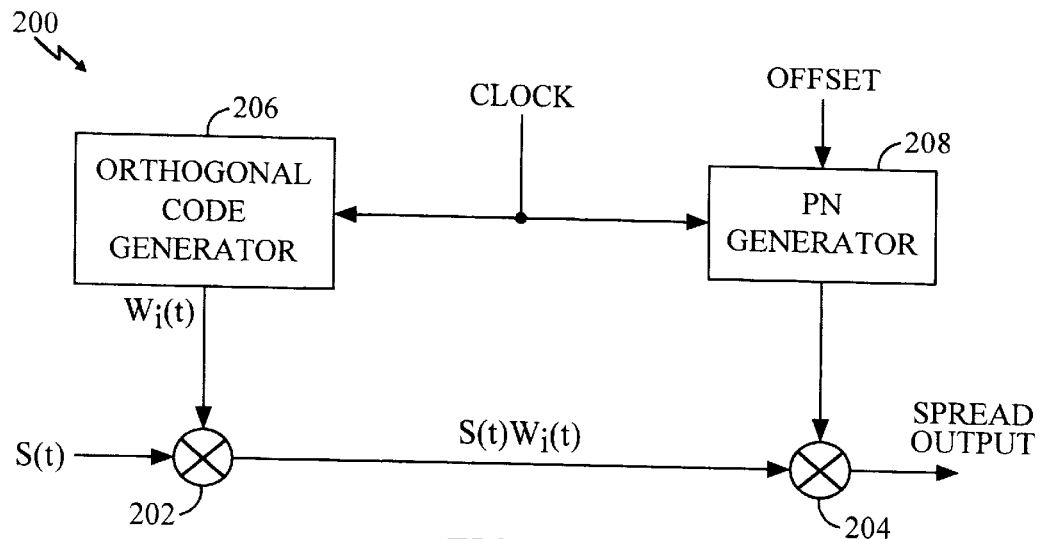
FIG. 2a illustrates a circuit block diagram depicting a signal modulator of conventional design.
Figure 2B:
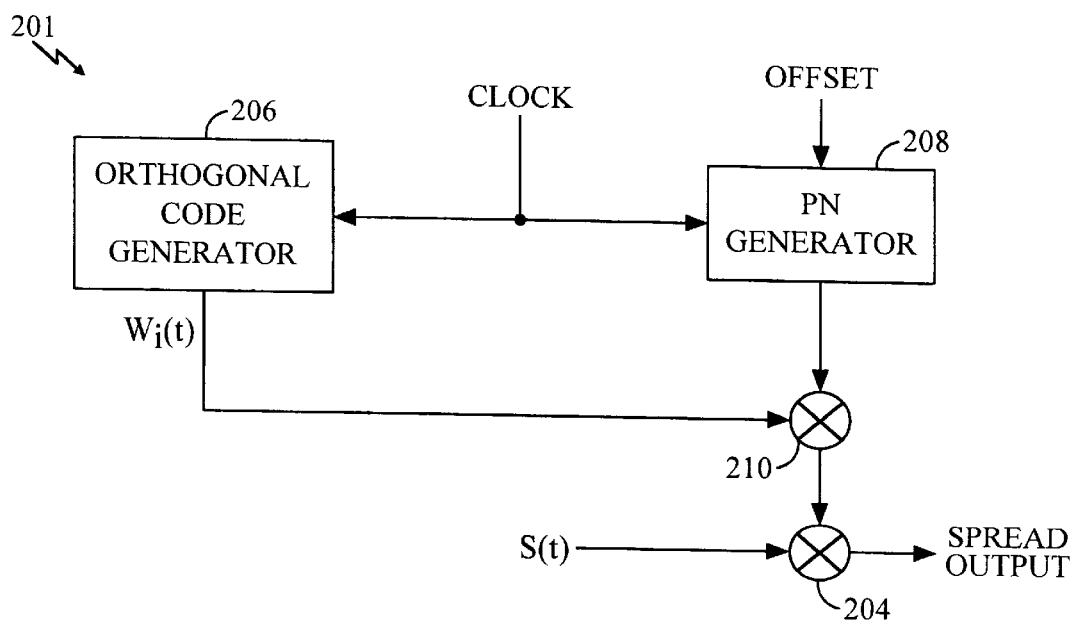
FIG. 2b illustrates a circuit block diagram depicting an alternative signal modulator of conventional design.

A block diagram of exemplary transmitter circuitry for implementing covering and spreading of data signals is illustrated in FIGS. 2a and 2b. A transmission modulator 200 in FIG. 2a use a first multiplier 202, a second multiplier 204, an orthogonal code or function generator 206, and a PN generator 208. Alternatively, as explained below, modulator 200 can employ a multiplier 210. Transmission modulator 200 receives data or previously encoded data symbols and orthogonally Encodes or covers them with an assigned orthogonal code sequence, Walsh code, and then spreads the covered data before transmission.

Referring now to FIG. 2a, an information signal S(t) is channelized through multiplication with a Walsh function W(t). An orthogonal function or Walsh code generator 206 generates the orthogonal covering code desired for channelizing the signal, using apparatus known in the art. The code $W_i(t)$ from generator 206 is multiplied by or combined with the symbol data in a logic element 202, which is generally a multiplier. In the exemplary embodiment, the orthogonal function is typically clocked in at a rate of 1.2288 MHz, although other known rates can be used.

The orthogonally covered data signal S(t)W(t) output by multiplier 202 is input to logic element or multiplier 204 which multiplies the signal by a PN spreading code. The resulting PN spread and orthogonally encoded output signal is then typically bandpass filtered, transferred to appropriate power control and amplification circuitry, and modulated onto an RF carrier. Alternatively, the PN spreading an orthogonal channelizing codes can be multiplied together or combined before they are combined with the data. This is illustrated in FIG. 2b where a transmission modulator 201 has the outputs of orthogonal code generator 206 and PN generator 208 transferred to a multiplier 210. Multiplier 210 produces a combined code which is then combined with the data signal S(t)W(t), again using multiplier 204.

The resulting signals may be further amplified and filtered before being summed with other forward link signals and radiated by an antenna. The filtering, amplification, and modulation operations are well understood in the art. As is known, alternate embodiments may interchange the order of some of these operations for forming a transmitted signal. Additional details on the operation of this type of transmission apparatus are found in U.S. Pat. No. 5,103,459, mentioned above.

PN generator 208 generates one or more different PN spreading codes for use in this process. This generator could be time shared among several transmitters using appropriate interface elements. An exemplary generation circuit for these sequences is disclosed in U.S. Pat. No. 5,228,054 entitled "Power Of Two Length Pseudo-Noise Sequence Generator With Fast Offset Adjustments," issued Jul. 13, 1993, and assigned to the assignee of the present invention, and incorporated herein by reference. Alternatively, the PN codes can be pre-stored in memory elements such as a ROM or RAM circuit. PN generator 208 may output a real-valued or complex-valued sequence, as desired. Thes PN spreading codes can also be the same code applied 90° out of phase in some applications.

Each PN sequence consists of a series of 'chips' occurring over a preselected PN code period at a frequency much higher than the baseband communication signal being spread. A typical chip rate is around 1.2288 MHz with a PN code sequence length or period of 1024 chips. However, this code length may be adjusted to increase code separation, or decrease searching times, as would be apparent to those skilled in the art. Each system design specifies the distribution of PN spreading codes within a communication system according to factors understood in the art.

A known clock source is used to provide timing information, and time offsets or offset values are typically provided by one or more control processors to affect the timing of these operations.

V. A QPSK Spreader

Figure 3:
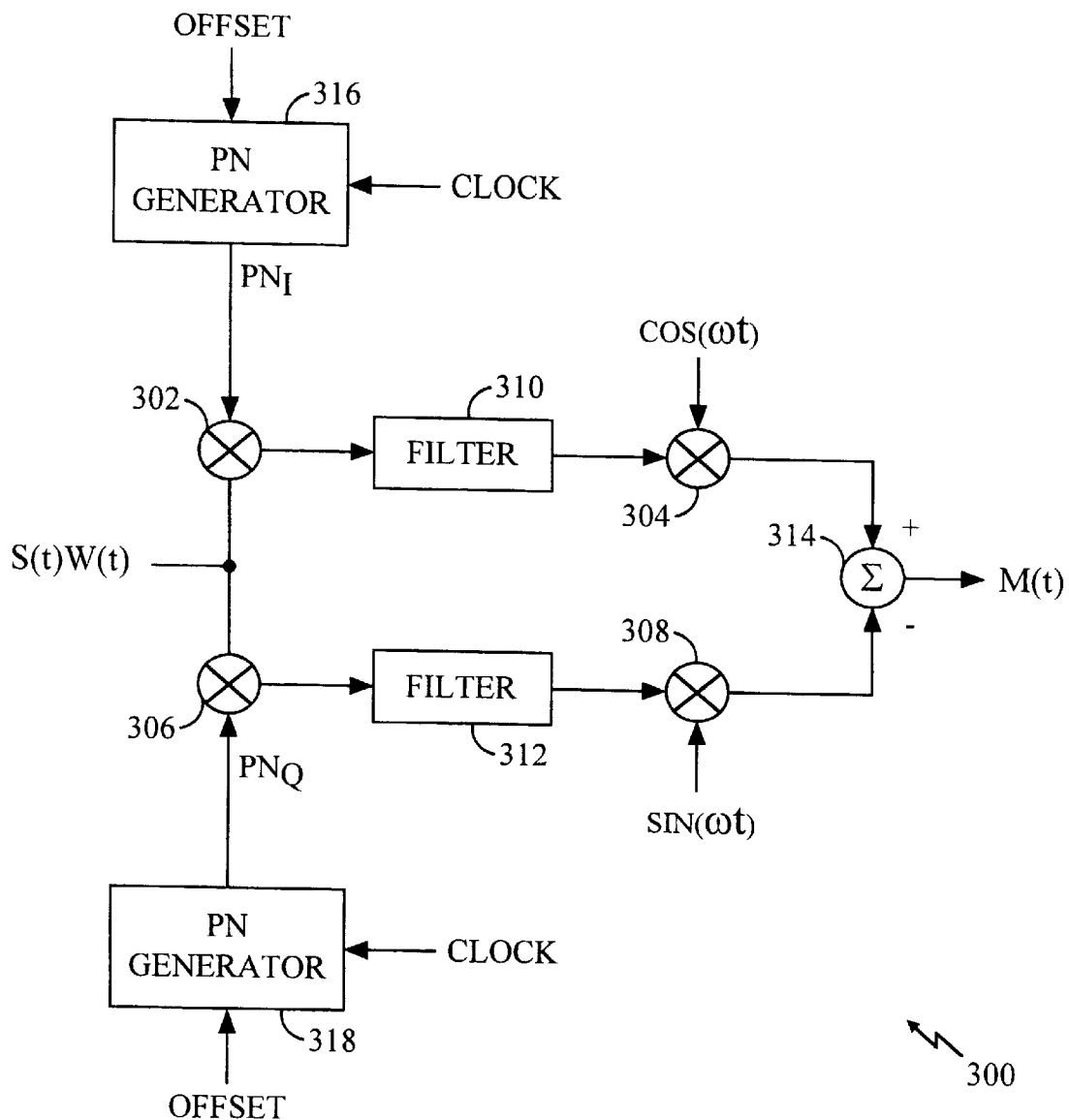
FIG. 3 illustrates a circuit block diagram depicting a QPSK spreader of conventional design.

A preferred embodiment of the invention hereinafter described employs a quadriphase-shift keying (QPSK) spreader of conventional design. After reading the following discussion, it will be apparent to a person skilled in the relevant art how other spreading schemes could be employed in the present invention. A block diagram of a QPSK spreader is illustrated in FIG. 3. QPSK spreader 300 is comprised of first and second in-phase multipliers 302 and 304, first and second quadrature multipliers 306 and 308, two filters 310 and 312, and a summation element or summer 314. Two PN generators 316 and 318 are used to provide in-phase and quadrature spreading codes, $PN_I$ and $PN_Q$, respectively, which are the same as PN generator 208 described above.

Referring now to FIG. 3, an information signal S(t) has been channelized through multiplication with a Walsh function W(t) to yield a channelized information signal S(t)W(t). Channelized information signal S(t)W(t) is applied to one input each of multipliers 302 and 306. Generally, the same data is input to both multipliers and subjected to combination with or modulation by the individual codes. Multiplier 302 multiplies input signal S(t)W(t) by an in-phase PN code $PN_I$, from PN generator 216. The resulting signal is then filtered by filter 310, a filter of conventional design, which is typically employed to provide pulse shaping, to contain the bandwidth of the transmitted signal. The filtered signal is then applied to multiplier 304, where it is multiplied by in-phase carrier signal $\cos((\omega t)$. Similarly, multiplier 306 multiplies input signal S(t)W(t) by quadrature PN code $PN_Q$, from PN generator 218. The resulting signal is then filtered by filter 312 and applied to multiplier 308, where it is multiplied by quadrature carrier signal $\sin(\omega t)$. As will be apparent to one skilled in the relevant art, other waveforms can be used as carrier signals. The resulting in-phase and quadrature components are then summed by summer 314 to produce QPSK-spread signal M(t), which may be further amplified and filtered before being summed with other forward link signals and radiated by an antenna, as before.

IV. An Embodiment of the Present Invention

Prior to the present invention, it was thought that multiple transmitters could not share a single CDM channel by sharing a set of orthogonal channelizing codes. It was further thought that to realize channel sharing, the respective carrier phases of the transmitted signals would have to be aligned at the receiver.

Unfortunately, such coordinated precorrection of carrier phases from multiple transmitters at geographically distributed sites is not considered technically feasible at the carrier frequencies of interest. As described below, Applicants found that, contrary to conventional wisdom, multiple transmitters may share a single CDM channel using orthogonal channelizing codes even though the respective transmitter carrier phases are not aligned upon reception. The transmitters' signals remain mutually orthogonal, regardless of carrier phase, under certain circumstances.

The reasons for the irrelevance of carrier phase are best described by example. Consider two transmitters, Transmitter X and Transmitter Y, as in base stations 112 and 114 or gateways 120 and 122, each generating basic carrier waveforms having phase 'x' and 'y', respectively. Transmitter X channelizes a data signal $S_x$ using Walsh function $W_x(i)$ and modulates the carrier to produce a transmitted signal $T_x(i)$, where i represents the chip number in the Walsh sequence; in this example, i ranges in value from 0 to 127. Transmitter Y channelizes a data signal $S_y$ using Walsh function $W_y(i)$ and modulates its carrier to produce a transmitted signal $T_y(i)$. Therefore, the transmitted signals can be represented as:

$$T_x(i) = S_x W_x(i) e^{j\phi x} \quad (4)$$

and $$T_y(i) = S_y W_y(i) e^{j\phi y} \quad (5)$$

Both transmitted signals are received by a Receiver X (124, 126) and uncovered or de-channelized using the Walsh function $W_x(i)$. It is assumed that with frequency precorrection, any relative difference in signal phase for the arriving signals are substantially constant. That is, while the phases may differ, they remain relatively constant over the Walsh function period being used. Because the product of a Walsh sequence with the same Walsh sequence is a unity sequence, the result for signal $T_x$ is given by the relationship:

$$\sum_{i=0}^{127} T_x(i) W_x(i) = \sum_{i=0}^{127} S_x W_x(i) W_x(i) e^{j\Phi_x} \quad (6)$$

$$= S_x e^{j\Phi_x} \sum_{i=0}^{127} (1)$$

$$= 128 S_x e^{j\Phi_x}$$

which is the desired data signal. Because the product of a Walsh sequence with another Walsh sequence from the same set is zero, the result for signal $T_y$ is given by the relationship:

$$\sum_{i=0}^{127} T_y(i) W_x(i) = \sum_{i=0}^{127} S_y W_x(i) W_y(i) e^{j\Phi_y} \quad (7)$$

$$= S_y e^{j\Phi_y} \sum_{i=0}^{127} W_x(i) W_y(i)$$

$$= S_y e^{j\Phi_y} * (0)$$

$$= 0$$

resulting in no interference. Thus, the carrier phase is irrelevant when the above-described conditions are met and the frequency alignment does not vary over the short period of the Walsh functions.

According to a preferred embodiment of the invention, each transmitter employs the same pair of quadrature PN spreading codes or sequences and offsets. (A PN code offset is a predetermined delay between a reference time and the start time of the PN code sequence.) Additionally, no one orthogonal channelizing code is assigned to more than one transmitter during the time period they are sharing a CDMA channel. The offsets are time-precorrected to ensure time alignment at the receiver. The frequencies of the signals are precorrected to ensure frequency alignment at the receiver.

Figure 4A:
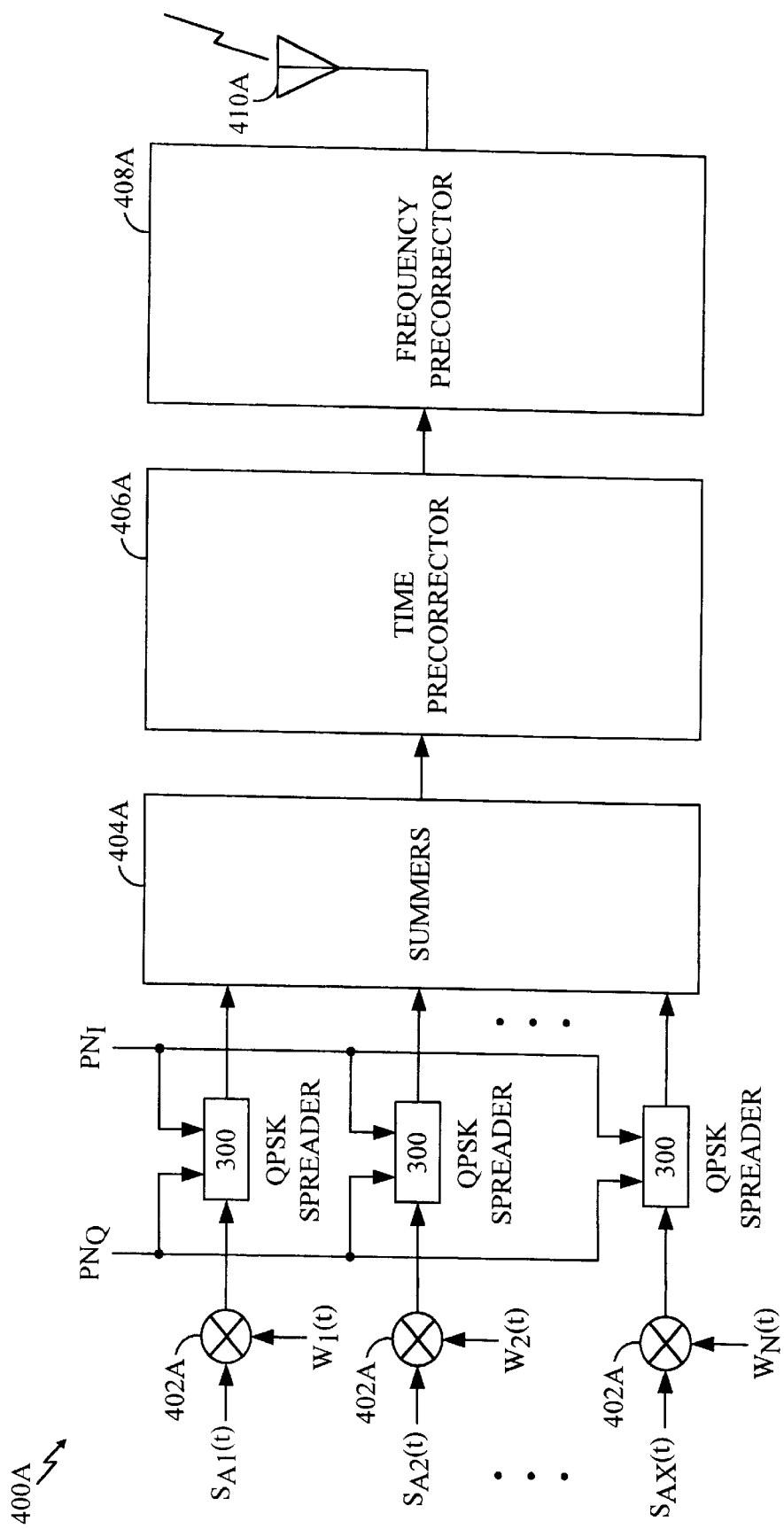
FIG. 4 illustrates a circuit block diagram depicting a preferred embodiment of the present invention.
Figure 4B:
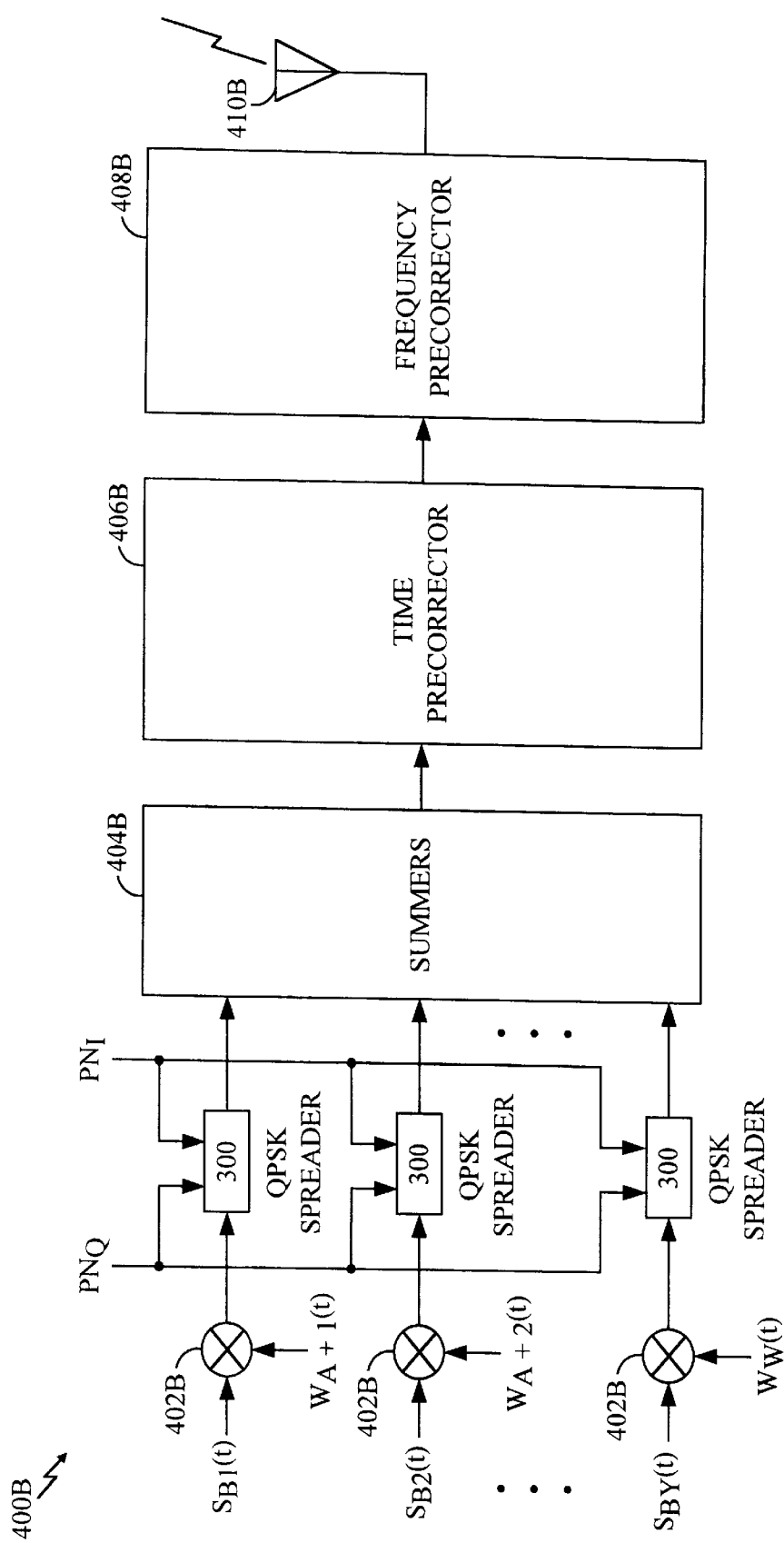

A circuit block diagram illustrating a preferred embodiment of the present invention is shown in FIG. 4. FIG. 4 presents a simple application of the invention, where only two transmitters, transmitter 400A and transmitter 400B, share a single CDMA channel. According to a preferred embodiment, one predefined set of Walsh codes is divided among the sharing transmitters. This is depicted in FIG. 4, which shows Walsh codes $W_1(t)$–$W_n(t)$ allocated to transmitter 400A and Walsh codes $W_{n+1}(t)$–$W_w(t)$ allocated to transmitter 400B, where "w" is the total number of Walsh codes in the set.

It should be readily apparent to those skilled in the art that the Walsh functions need not be assigned or grouped in a strictly consecutive serial order but can be assigned using other assignment patterns as desired. That is, the present invention does not require say Walsh functions 1–16 to be assigned to one transmitter while Walsh functions 17–32 are assigned to another transmitter as continuous 'blocks' or sequences (1 to n and n+1 to w). For example, Walsh functions 1, 3, 5, . . . 31 could be assigned to one transmitter while another receives Walsh functions 2, 4, 6, . . . 32 for use. The functions can be assigned as small groups or alternating sequences or using other known patterns. Any variety of groupings, combinations, or ordering of Walsh functions may be used as long as the respective transmitters are not using common Walsh Functions at the same time on the same CDM channel.

An example of how such assignments work is shown for a preferred embodiment illustrated in Table I below. In the illustrated assignment scheme, two gateways, labeled as a first gateway (GW) and a second gateway (GW), share a common beam and frequency in a CDMA spread spectrum communication system. Designated functions for a particular set of nine channels are listed along with their respective Walsh function assignments.

TABLE I

| Channel | First GW | Second GW |
|---|---|---|
| Pilot | 0 | 1 |
| Synchronization | 32 | 33 |
| Paging 1 | 64 | 65 |
| Paging 2 | 2 | 3 |
| Paging 3 | 66 | 67 |
| Paging 4 | 4 | 5 |
| Paging 5 | 68 | 69 |
| Paging 6 | 6 | 7 |
| Paging 7 | 70 | 71 |

In this specification, the preferred embodiment is described as having two transmitters and one receiver. It will be apparent to one skilled in the relevant art that the principle of the present invention can be extended to enable multiple transmitters and multiple receivers to share a single CDMA channel. Further, it will be apparent to one skilled in the art that the receivers can be replaced by repeaters (e.g., satellite transponders, terrestrial repeaters, etc.) and that the time and frequency precorrection of the present invention can be performed by either the transmitter or the repeater. For example, time and frequency precorrection could be performed for a group of users by sharing a single transponder in a satellite, or repeater, and precorrecting the signal up to the point of transmission by the transponder.

In this specification, the present invention is described with respect to signal transmission. As will be apparent to one skilled in the relevant art, a variety of receivers may be employed with the present invention. A typical receiver is disclosed in U.S. Pat. No. 5,103,459 entitled "System and Method for Forming Signal Waveforms in a CDMA Cellular Telephone System," assigned to the assignee of the preset invention, and incorporated herein by reference.

Further according to a preferred embodiment, the same PN polynomial and offset are allocated to each sharing transmitter. This is depicted in FIG. 4, which shows one quadrature pair of PN sequences $PN_Q$ and $PN_I$ allocated to both transmitter 400A and transmitter 400B.

Referring to FIG. 4, the transmitters comprise multipliers 402A, 402B, QPSK spreaders 300, summers 404A, 404B, time precorrectors 406A, 406B, frequency precorrectors 408A, 408B, and antennas 410A, 410B.

Figure 5:
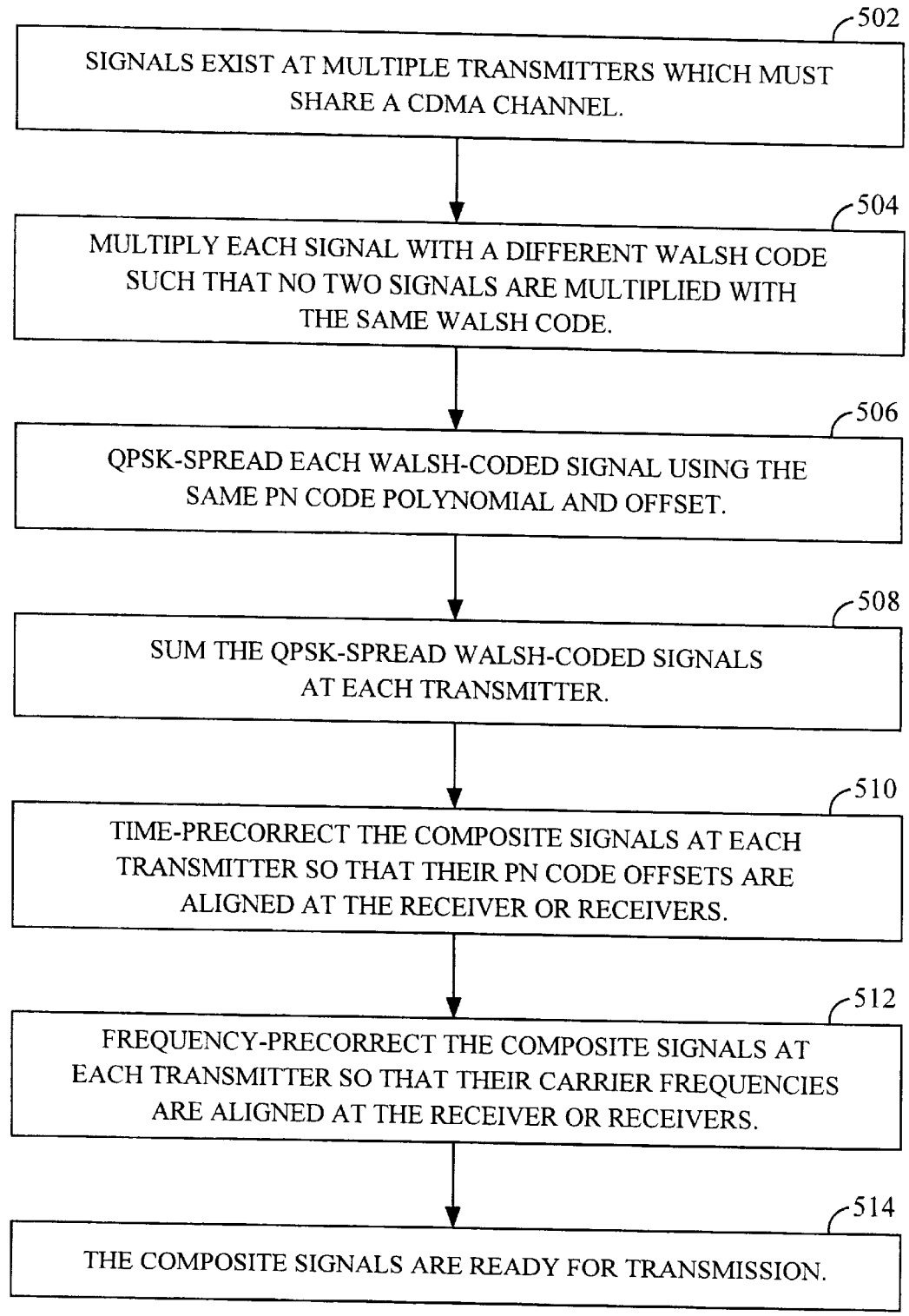
FIG. 5 illustrates a flowchart depicting the operation of a preferred embodiment of the present invention.

A flowchart depicting the operation of a preferred embodiment of the present invention is illustrated in FIG. 5. Now, a preferred embodiment of the present invention is described in detail with reference to FIGS. 4 and 5.

Referring to FIG. 5, in a step 502, a number of user signals exist at multiple transmitters which must share a single CDMA channel. The user signals may be voice, data, etc. These signals are represented in FIG. 4 as $S_{A1}$–$S_{AX}$ at transmitter 400A and $S_{B1}$–$S_{BY}$ at transmitter 400B. In a step 504, each user signal is multiplied with a different Walsh code sequence by multipliers 402A and 402B. No two user signals $S_{A1}$–$S_{AX}$ and $S_{B1}$–$S_{BY}$ are multiplied by the same Walsh code sequence. The Walsh codes are depicted in FIG. 4 as $W_1(t)$–$W_n(t)$ allocated to transmitter 400A and $W_{n+1}(t)$–$W_w(t)$ allocated to transmitter 400B.

Next, in a step 506, the output of each multiplier 402A, 402B is QPSK spread by one or more QPSK spreaders 300 using the same pair of quadrature PN polynomials and offsets. The operation of QPSK spreader 300 is described in Section III above. Then, in a step 508 the resulting Walsh-coded, QPSK-spread signals are summed at each transmitter by summers 404A and 404B respectively. In a step 510, the composite signals are time-precorrected by time precorrectors 406A, 400B, respectively, to ensure that the PN offsets of the composite signals emanating from the transmitters are time-aligned at the receiver or receivers for which reception is desired. As described above, transmitters 400A, 400B are generally located in base stations or gateways, and the approximate distances to the various receivers/transponders are known; thus the required timing precorrections can easily be calculated.

In a step 512, the time-precorrected composite signals are frequency-precorrected by frequency precorrectors 408A, 408B to ensure that the composite signals emanating from the transmitters are frequency-aligned at the receiver or receivers. In a step 514, the composite signals are ready for transmission via antennas 410A, 410B.

After reading the above description, it will become apparent to a person skilled in the relevant art how to implement the invention using other alternative embodiments.

V. Frequency Estimation Using Multiple Pilot Signals

In a CDMA receiver, the frequency of a transmitter's carrier is generally estimated using the pilot signal of a single transmitter occupying the CDMA channel. It is generally desirable to minimize the power of a transmitted signal. However, the difficulty of frequency tracking in CDMA systems may be exacerbated by the use of low-power pilot signals. A feature of the present invention is that it permits the use of the multiple pilot signals of the plurality of transmitters sharing the CDMA channel to estimate the transmitters' carrier frequency. (As noted above, the carrier frequencies of the transmitters sharing the CDMA channel are aligned. In addition, because the carrier phases of the sharing transmitters are not required to be aligned, each transmitter transmits a separate pilot signal to enable coherent demodulation.)

Figure 6:
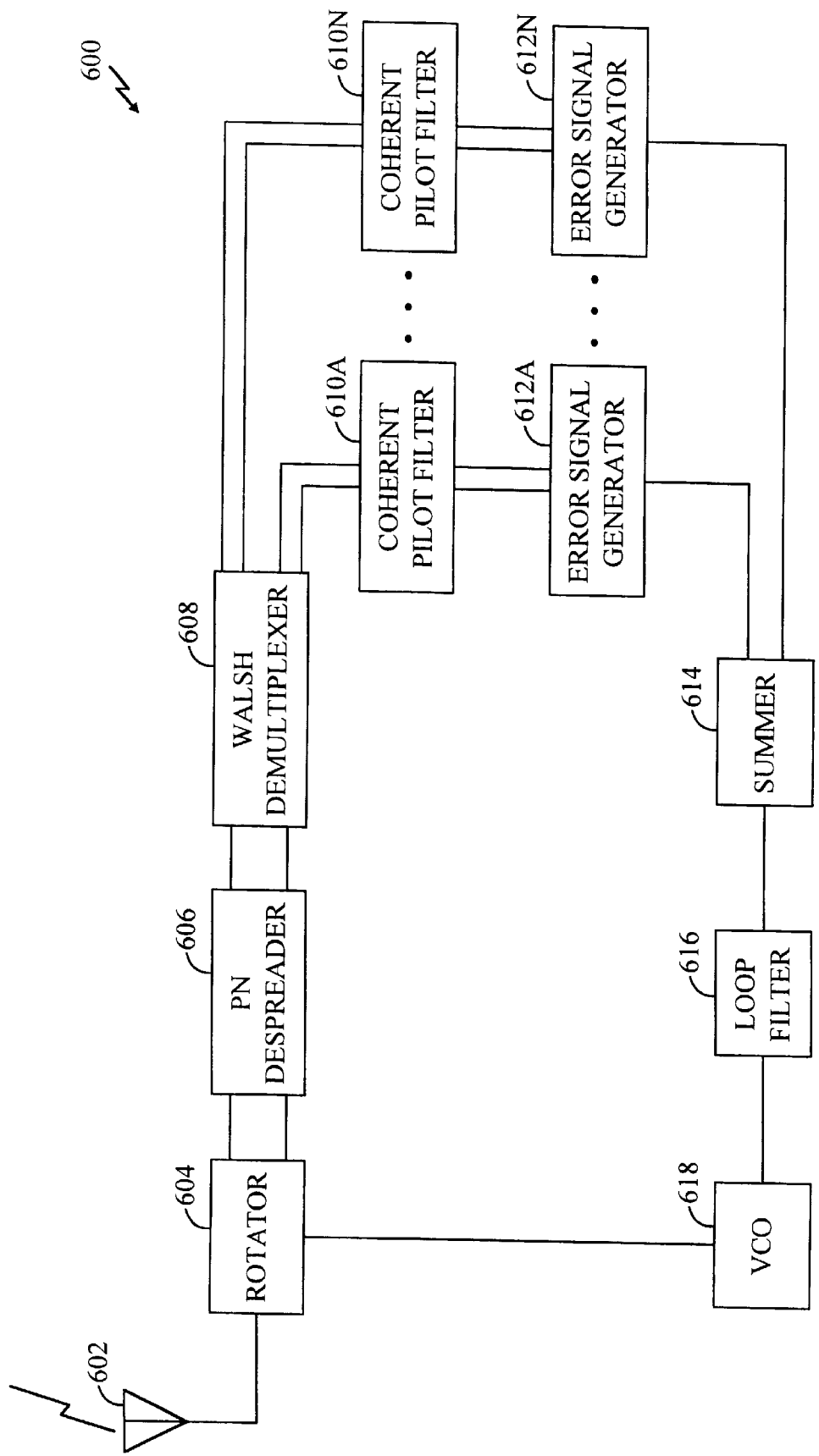
FIG. 6 illustrates a circuit block diagram of an automatic frequency control loop employing multiple pilot sigials to obtain an estimate of the carrier frequency of a received QPSK signal and FIG. 7 illustrates a flowchart depicting the operation of the automatic frequency control loop of FIG. 6.

A circuit block diagram of an automatic frequency control loop 600 employing multiple pilot signals to obtain an estimate of the carrier frequency of a received QPSK signal is shown in FIG. 6. The circuit in FIG. 6 comprises an antenna 602, a rotator 604, a PN despreader 606, a Walsh demultiplexer 608, coherent pilot filters 610 (610A–610N), frequency error signal generators 612 (612A–612N), a summer 614, a loop filter 616, and a voltage-controlled oscillator (VCO) 618.

Figure 7:
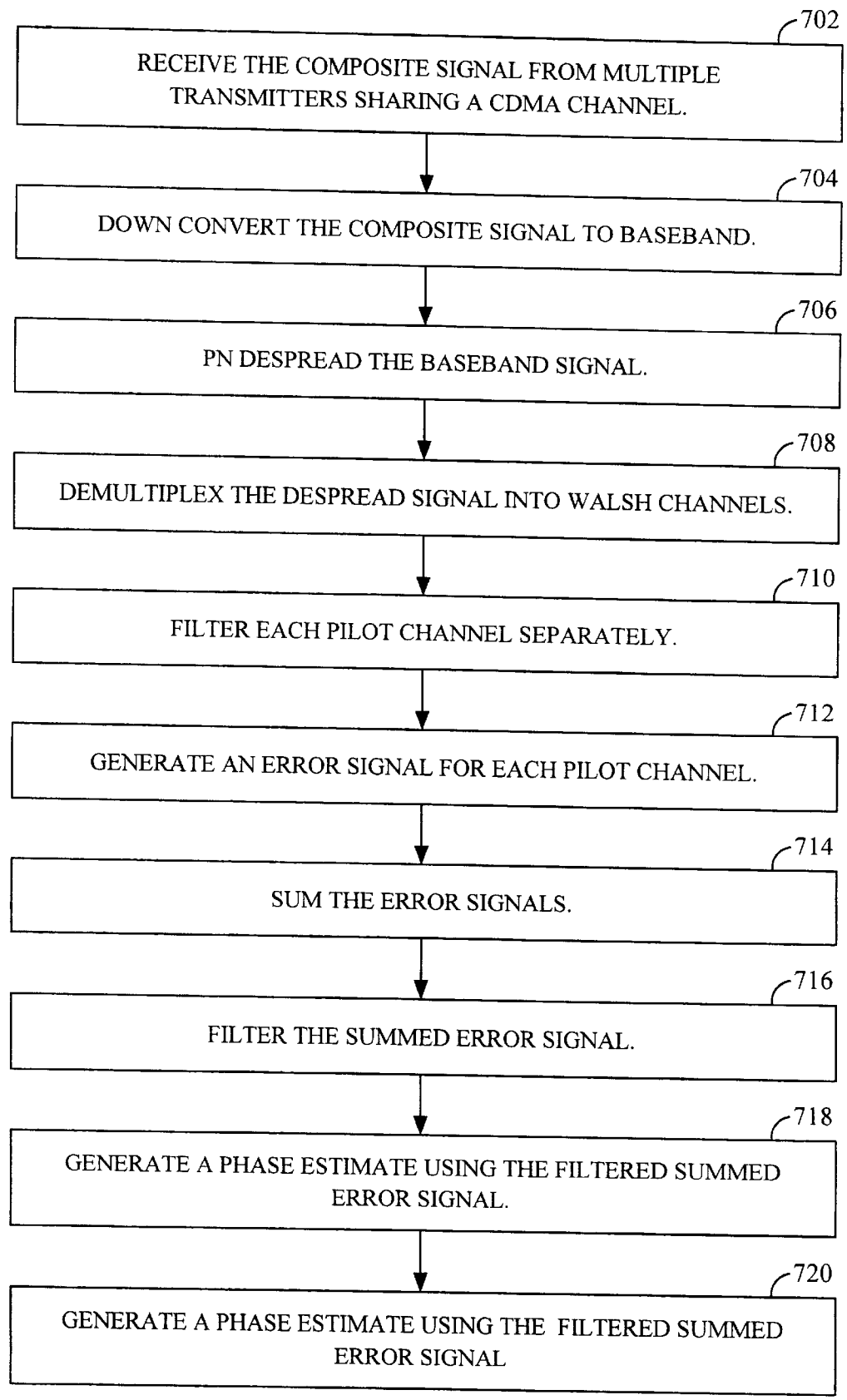

A flowchart depicting the operation of automatic frequency control loop 600 is shown in FIG. 7. Now, the operation of automatic frequency control loop 600 is described in detail with reference to FIGS. 6 and 7.

Referring to FIG. 7, in a step 702 the composite signal, comprising signals transmitted from multiple transmitters sharing a CDMA channel, is received at antenna 602. In a step 704, rotator 604 downconverts the received composite signal to baseband. In a step 706, the baseband signal is despread using a PN code at an appropriate time offset by PN despreader 606. In a step 708, the despread baseband signal is demultiplexed into separate Walsh channels, A through N, by Walsh demultiplexer 608. Among the resulting Walsh channels is one pilot channel for each transmitter sharing the CDMA channel. In a step 710, each pilot channel is filtered by coherent pilot filters 610A–N, which may include an integrate-and-dump function.

In a step 712, each error signal generator 612A–N calculates a term proportional to the frequency error for each pilot signal. In an exemplary or preferred embodiment, the frequency error signal is calculated by taking the cross product between vectors representing the current sample of the pilot signal and the previous sample of the pilot signal, for both in-phase, I, and quadrature, Q, channels. For a current pilot sample of $I_k$, $Q_k$ and a previous pilot sample $I_{k-1}$, $Q_{k-1}$ the resulting frequency error is given by $I_{k-1}Q_k - Q_{k-1}I_k$. The error signal may be positive or negative; an error signal of zero indicates no frequency error.

In a step 714, the frequency error signals for all of the pilot signals are combined by a summation element or summer 614. In a step 716, the composite error signal is filtered by loop filter 616. In a step 718, the filtered error signal is converted to a phase estimate by VCO 618. In a step 720, the phase estimate is applied to rotator 604 to adjust the phase of the received composite signal.

VI. Conclusion

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What we claim as our invention is:

1. A method of enabling a plurality of transmitters to share a single code division multiplexed (CDM) channel in a CDM communications system, each transmitter having a plurality of communications channels for transmitting a plurality of data signals, comprising the steps of:

assigning a predefined set of orthogonal channelizing codes to the plurality of transmitters in a predetermined manner;

at each transmitter:

channelizing each of the plurality of data signals using one of the orthogonal channelizing codes to produce a plurality of channelized data signals;

spreading the plurality of channelized data signals using at least one pseudonoise (PN) code to produce a plurality of spread data signals;

summing the plurality of spread data signals prior to transmission to produce a composite signal; and frequency precorrecting the composite signal prior to transmission such that the composite signal is frequency-aligned upon reception.

2. The method of claim 1, wherein said orthogonal channelizing codes are Walsh functions.

3. The method of claim 2, wherein no one Walsh function is assigned to more than one transmitter at a time.

4. The method of claim 3, wherein one PN code is assigned to the plurality of transmitters.

5. The method of claim 4, further comprising the step of:
time precorrecting said composite signal of each transmitter prior to transmission such that said PN codes of said composite signals are time aligned upon reception.

6. The method of claim 1, wherein said code division multiplexed (CDM) communications system comprises a wireless spread spectrum code division multiple access (CDMA) communications system with each data signal being a user signal, and said step of channelizing comprises channelizing each of said user signals using one of said orthogonal channelizing codes to produce a channelized user signal.

7. The method of claim 1, further comprising the steps of:
receiving at least two user signals sharing a single channel as a combined signal;
despreading said received signals with respect to at least one predetermined pseudonoise (PN) spreading code;
demultiplexing said composite signals into a plurality of individual data signals with respect to preselected orthogonal channelizing codes;
coherently filtering out each of at least two pilot signals corresponding to said individual signals;
generating an error signal from each of said filtered pilot signals; and
summing the resulting error signals.

8. The method of claim 7, further comprising the steps of:
downconverting received spread spectrum signals to a baseband frequency by rotation prior to demultiplexing;
filtering summed resulting error signals; and
adjusting said downconverting in response to filtered summed error signals.

9. The method of claim 8, wherein said step of generating an error signal comprises forming a cross product between current samples of each pilot signal and previous samples thereof.

10. A code division multiplexed (CDM) communications system having multiple transmitters, each transmitting at least one data signal sharing a single CDM channel, each transmitter comprising:
at least one signal processing path carrying one of said data signals;
multiplier means for combining each data signal with a different orthogonal channelizing code;
a summer, coupled to said signal processing paths, for summing the signals produced by said signal processing paths at each transmitter prior to transmission;
a time precorrector, coupled to said summer, for precorrecting the signal produced by said summer such that the PN codes of the transmitted signals of the plurality of transmitters are time aligned upon reception; and
a frequency precorrector, coupled to said time precorrector, for precorrecting the signal produced by said time precorrector such that the carrier frequencies of the transmitted signals of the plurality of transmitters are time and frequency aligned upon reception.

11. The system of claim 10, wherein said orthogonal channelizing codes are Walsh functions.

12. The system of claim 11, wherein no Walsh function is assigned to more than one transmitter over a common operating period of time.

13. The system of claim 12, wherein each of said signal processing paths further comprises a spreader, coupled to said multiplier means, for spreading the signal produced by said multiplier means using at least one PN spreading code.

14. The system of claim 13, wherein one pseudonoise (PN) code is assigned to the plurality of transmitters.

15. The system of claim 13, wherein said spreader is a quadriphase-shift keying (QPSK) spreader and said at least one PN code comprises a pair of quadrature PN spreading codes.

16. The system of claim 10, wherein said CDM communications system comprises a wireless spread spectrum code division multiple access (CDMA) system with each of said data signals being a user signal, wherein said at least one signal processing path carries one of said user signals, and said multiplier means combines each user signal with a different orthogonal channelizing code.

17. A code division multiplexed (CDM) communications system having a plurality of transmitters, each transmitting a plurality of data signals sharing a single CDM channel, wherein each transmitter comprises:
means for assigning a set of orthogonal channelizing codes to the plurality of transmitters in a predetermined manner;
means for channelizing each of said plurality of data signals using one of said orthogonal channelizing codes to produce a plurality of channelized data signals;
means for spreading said plurality of channelized signals using at least one pseudonoise (PN) spreading code to produce a plurality of spread signals;
means for summing said plurality of spread signals prior to transmission to produce a composite signal; and
means for frequency precorrecting said composite signal prior to transmission such that said composite signal is frequency-aligned upon reception.

18. The system of claim 17, wherein said orthogonal channelizing codes are Walsh functions.

19. The system of claim 18, wherein no one Walsh function is assigned to more than one transmitter at a time.

20. The system of claim 19, wherein one PN code is assigned to the plurality of transmitters.

21. The system of claim 20, further comprising means for time precorrecting said composite signal of each transmitter prior to transmission such that said PN codes of said composite signals are time aligned on reception.

22. The system of claim 17, wherein said communications system is a code division multiple access (CDMA) spread spectrum communications system and said data signals are user signals sharing a single CDMA channel; and wherein said means for channelizing comprises means for channelizing each of said user signals using one of said orthogonal channelizing codes to produce a channelized user signal.

23. The communications system of claim 17, further comprising:
means for receiving at least two user signals sharing a single channel as a combined signal;
means for despreading said received signals with respect to at least one predetermined pseudonoise (PN) spreading code;
means for demultiplexing said composite signals into a plurality of individual data signals with respect to preselected orthogonal channelizing codes;

means for coherently filtering out each of at least two pilot signals corresponding to said individual data signals;

means for generating an error signal from each of said pilot signals; and means for summing resulting error signals.

24. The communications system of claim 23, further comprising:

rotation means for downconverting received spread spectrum signals to a baseband frequency prior to demultiplexing;

means for filtering summed resulting error signals; and means for adjusting operation of said rotation means in response to filtered summed error signals.

25. The communications system of claim 23, wherein said means for generating an error signal comprises means for forming a cross product between current samples of each pilot signal and previous samples thereof.

26. A method for automatically controlling frequency in a code division multiplexed (CDM) communications system having a plurality of transmitters sharing a single CDM channel, wherein each transmitter transmits at least one signal that is channelized with one of a plurality of orthogonal channelizing codes, spread with a pseudonoise (PN) spreading code, and frequency precorrected for frequency alignment upon reception, the method comprising the steps of:

receiving a combined signal, the combined signal comprising a plurality of individual signals that are transmitted by at least one of the plurality of transmitters;

despreading the combined signal using the PN spreading code;

demultiplexing the combined signal into the plurality of individual signals with respect to the plurality of orthogonal channelizing codes;

coherently filtering each of at least two of the plurality of individual signals;

generating an error signal from each of the filtered individual signals; and summing the error signals.

27. The method of claim 26, further comprising the steps of:

downconverting the received combined signal to a baseband frequency by rotation prior to performing said demultiplexing step;

filtering the summed error signals; and adjusting said downconverting step in response to the filtered summed error signals.

28. Apparatus for automatic frequency control in a code division multiplexed (CDM) communications system having a plurality of transmitters sharing a single CDM channel, wherein each transmitter transmits at least one signal that is channelized with one of a plurality of orthogonal channelizing codes, spread with a pseudonoise (PN) spreading code, and frequency precorrected for frequency alignment upon reception, comprising:

means for receiving a combined signal, the combined signal comprising a plurality of individual signals that are transmitted by at least one of the plurality of transmitters;

means for despreading the combined signal using the (PN) spreading code;

means for demultiplexing the composite signal into the plurality of individual signals with respect to the plurality of orthogonal channelizing codes;

means for coherently filtering each of at least two of the plurality of individual signals;

means for generating an error signal from each of the filtered individual signals; and means for summing the error signals.

29. The method of claim 1, further comprising the step of:

time precorrecting said composite signal of each transmitter prior to transmission such that said PN codes of said composite signals are time aligned upon reception.

30. The system of claim 17, further comprising means for time precorrecting said composite signal of each transmitter prior to transmission such that said PN codes of said composite signals are time aligned on reception.

* * * * *